Nov. 2, 1954
D. G. RUSS
2,693,081
APPARATUS FOR CONTROLLING GAS TURBINE ENGINES
DURING TRANSIENT OPERATION
Filed April 4, 1951
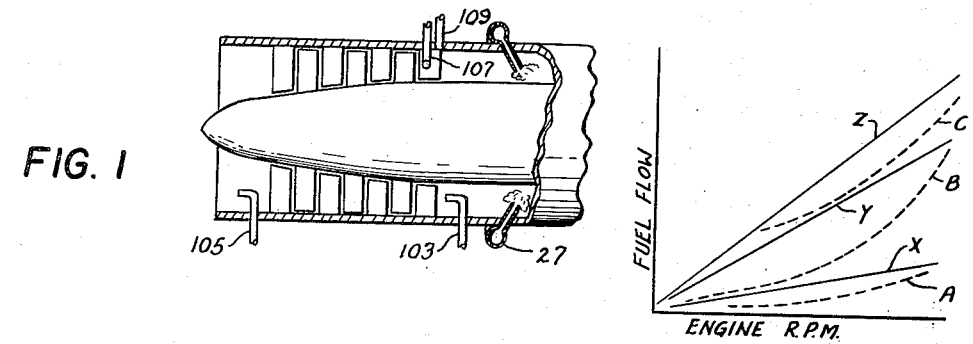
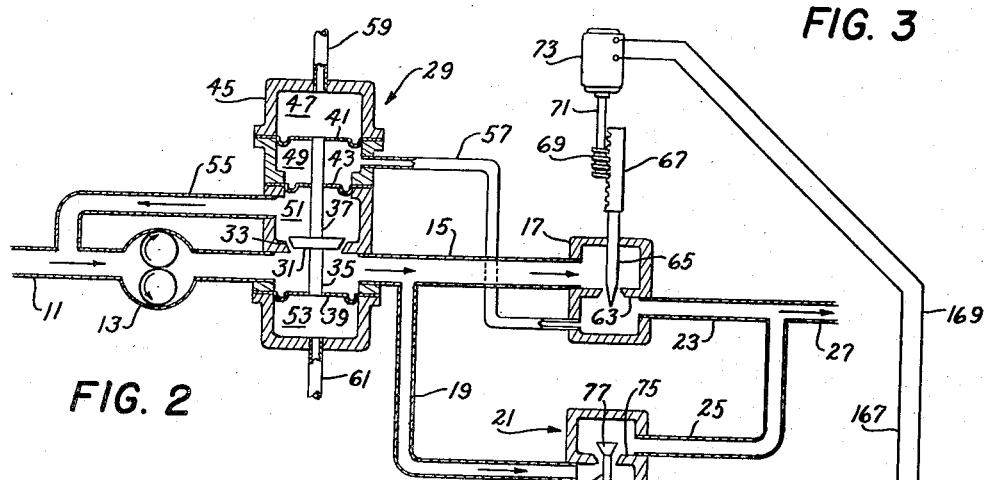
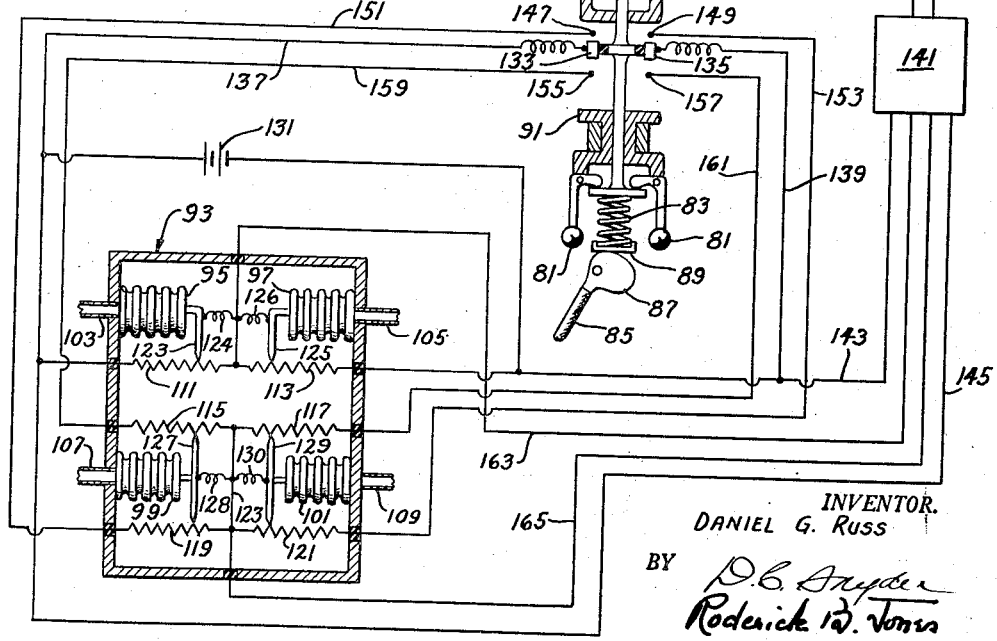
INVENTOR.
DANIEL G. RUSS
BY
*D. C. Snyder*
*Roderick W. Jones*
ATTORNEYS

United States Patent Office 2,693,081
Patented Nov. 2, 1954

2,693,081

APPARATUS FOR CONTROLLING GAS TURBINE ENGINES DURING TRANSIENT OPERATION

Daniel G. Russ, Erlton, N. J., assignor of one-half to Allen S. Atkinson, Silver Spring, Md.

Application April 4, 1951, Serial No. 219,303

(Granted under Title 35, U. S. Code (1952), sec. 266)

6 Claims. (Cl. 60—39.28)

The invention described herein may be manufactured and used by or for the Government of the United States of America without the payment of any royalties thereon or therefor.

This invention relates to improvements in the structure of gas-turbine engines, and more particularly pertains to improvements in apparatus for controlling gas-turbine engines during transient operation. By virtue of the structure disclosed, the control of fuel flow to gas-turbine engines and the regulation of such engines is effected so that compressor surge during transient acceleration and combustion blowout during transient deceleration are prevented.

Compressor surge or stall in a gas-turbine engine is a cause of poor performance and serious vibration with possible structural damage, especially when the surge is violent, repeated or prolonged. Heretofore these conditions of surge or stall have been attacked by the application to individual units of suitable variables determined empirically. Alternatively, the use of corrected R. P. M., wherein the actual R. P. M. and temperature are the fundamental variables, has been employed. The present invention is based on rational compressor performance behavior, using pressures as the basic control activating variables, and thus providing instantaneous response and relatively simple mechanistic activators as compared with references such as R. P. M. and temperature.

The principal object of this invention is to provide apparatus for controlling gas-turbine engines during transient operation to prevent compressor surge during transient acceleration and to prevent combustion blowout during transient deceleration.

Another object of this invention is to provide an improved structure adapted to eliminate the undesirable operating characteristics of gas-turbine engines that result from compressor surge during transient acceleration and from combustion blowout during transient deceleration.

Other objects and many of the attendant advantages of this invention will be readily appreciated as the same becomes better understood by reference to the following detailed description when considered in connection with the accompanying drawing wherein:

Fig. 1 is a fragmentary schematized cross-section of compressor stages of a gas-turbine engine, showing the relative positions of total and static pressure intelligence pickups;

Fig. 2 is a diagrammatic view of apparatus for controlling gas-turbine engines during transient operation, showing a preferred embodiment of the invention, and Fig. 3 is a diagram showing the operating characteristics of the device.

Similar numerals refer to similar parts throughout the several views.

The subject invention applies the discovery that the performance of an axial, centrifugal or mixed flow compressor, as represented by the ratio of the total discharge pressure to the total inlet pressure, or any fraction thereof developed by one or more stages of the compressor, can be expressed as a unique function of another pressure ratio, $$\frac{Pt}{Ps}$$

where $Pt$ is total pressure and $Ps$ is static pressure. This pressure ratio, taken in the compressor at incipient surge conditions, is a measure of the Mach number, equivalent or corrected speed, or equivalent or corrected weight flow at which the compressor is operating, such quantities being unique functions of each other along the curve representing the incipient surge characteristics of the compressor.

Accordingly, an infinite number of possible locations for measuring the pressure ratio $$\frac{Pt}{Ps}$$

are available within the compressor. A suitable location for a pressure tube for obtaining $Pt$ is in the final compressor stage, with the tube disposed normal to the direction of air flow. In any compressor stage, the maximum total pressure can be obtained by placing the axis of the end portion of the total-pressure tube parallel to, and with the mouth facing the air flow through the compressor at that point. Such tube can be located in an axial, tangential or arbitrary intermediate position relative to the rotor. The static pressure $Ps$ can be measured by a static tube located so as to measure the static pressure of the air at the inner surface of the compressor shell or casing, at a point proximate the location of the mouth of the total pressure tube.

Taking the overall compressor pressure ratio as the particular developed pressure ratio under consideration (because the overall compressor pressure ratio represents a maximum and is convenient to obtain) and designating this ratio as $$\frac{Pt_2}{Pt_1}$$

the incipient stall characteristic can be represented by the relation $$\frac{Pt_2}{Pt_1}=f\left(\frac{Pt}{Ps}\right) \qquad (1)$$

where $f$ is a function determined experimentally.

The design of gas-turbine engines is such that during steady-state conditions the compressor operates at values of $$\frac{Pt_2}{Pt_1}$$

that are lower than the level defined by Equation 1, and operation is stable. During acceleration, however, additional fuel in excess of steady-state requirements is supplied to develop acceleration torque. As a result, the compressor pressure ratio $$\frac{Pt_2}{Pt_1}$$

increases rapidly compared to the Mach number or equivalent speed, and hence increases rapidly compared to $$\frac{Pt}{Ps}$$

so that the incipient stall limit defined by Equation 1 can be exceeded. Therefore, the danger of compressor surge usually occurs during the period of acceleration. It follows that compressor surge can be prevented by restricting the compressor ratio during acceleration to the limit expressed by Equation 1.

With regard to the provision of means for controlling engine-fuel flow so as to prevent compressor stall and its allied undesirable operating characteristics, the foregoing analysis governs. In a practical case, the function $f$ of Equation 1 reduces to an exponential function such that $$\frac{Pt_2}{Pt_1}=\left(\frac{Pt}{Ps}\right)^n=\frac{Pt^n}{Ps^n} \qquad (2)$$

where $n$ is a positive real constant that is established experimentally. It follows that compressor stall can be prevented by restricting the compressor ratio during deceleration to the limit expressed by Equation 2.

A specific embodiment of the foregoing principles and relations is shown in Fig. 2. Fuel is admitted to the device from a fuel tank (not shown) through conduit 11 to a gear-type fuel pump 13. Said fuel pump 13 is driven by a shaft (not shown) that is geared directly to the engine. After leaving pump 13, the fuel passes through conduit 15 to acceleration valve 17 and through conduit 19 to governor valve 21, the acceleration and governor valves thus being arranged in parallel relation. Conduit 23 provides a fuel outlet from acceleration valve 17 and conduit 25, which provides a fuel outlet from governor valve 21, is coupled to conduit 23 to combine the fuel flows in conduit 27, which carries the fuel to the engine fuel manifold (not shown).

Relief-valve assembly 29 contains poppet-type valve 31 and mating valve seat 33. Valve stem 35 is attached to and extends from valve 31 and valve stem 37 is attached to and extends from the opposite face of said valve 31. A flexible diaphragm 39 is attached to the end of valve stem 35 and a flexible diaphragm 41 is attached to the end of valve stem 37. At the mid portion of valve stem 37, a flexible diaphragm 43 is attached.

Diaphragms 41, 43 and 39, and valve 31, are all housed within casing 45 so as to form chambers 47, 49, 51, and 53. Fuel is conveyed from chamber 51 back to the inlet of the pump 13 through conduit 55. The pressure in conduit 27 is conveyed to chamber 49 by conduit 57. Similarly, engine pressure $Pt_1$, is conveyed to chamber 47 by pipe 59 and engine pressure $Pt_2$ is conveyed to chamber 53 by pipe 61.

Summing the forces on the valve and stem assembly, it is apparent that $$Pt_2A_{39}+P_{15}A_{31}+P_{11}A_{43}+P_{27}A_{41}- \\ Pt_1A_{41}-P_{27}A_{43}-P_{11}A_{31}-P_{15}A_{39}=0 \quad (3)$$

where $A_{39}$=area of diaphragm 39
$P_{15}$=pressure in conduit 15
$A_{31}$=area of valve 31
$P_{11}$=pressure in conduit 11
$A_{43}$=area of diaphragm 43
$P_{27}$=pressure in conduit 27
$A_{41}$=area of diaphragm 41

The construction of the valve assembly is such that $$KA_{41}=KA_{39}=A_{43}=A_{31} \quad (4)$$

where K is a constant whose value is less than one.
Combination of Equations 3 and 4 gives $$P_{15}-P_{27}=\frac{Pt_2-Pt_1}{1-K} \quad (5)$$

It is evident from Equation 5 that the pressure drop $(P_{15}-P_{27})$ through acceleration valve 17 and governor valve 21 is proportional to the pressure rise through the engine compressor $(Pt_2-Pt_1)$ and that the pressure differential $Pt_2-Pt_1$ increases as the rotational speed of the compressor increases and as the altitude of operation decreases. With the proper selection of the constant K, the resulting fuel-flow characteristics at sea level and at altitude conditions will be in accordance with the relative values shown in Fig. 3.

Acceleration valve 17 contains orifice plate 63 into which needle 65 moves on a vertical axis so as to vary the orifice area and the rate of flow of fuel through said valve 17. Needle 65 carries gear rack 67, which is engaged by a worm gear 69 fixed on the shaft 71 of motor 73. Governor valve 21 contains orifice plate 75 within which valve 77, carried on valve stem 79, is moved along a vertical axis by the combined action of flyweights 81 and the speeder spring 83. Said speeder spring 83 is compressed by movement of control lever 85, which acts on said spring 83 through cam 87 and compression plate 89. The flyweights 81 are driven through gear 91 by the engine through a suitable gear train (not shown).

Change in the areas of the orifices of the acceleration and governor valves is effected as follows: A casing 93 is evacuated and contains flexible bellows 95, 97, 99 and 101. Engine pressures $Pt_2$, $Pt_1$, $Pt$ and $Ps$, which are measured as shown in Fig. 1, are conveyed to the interior of bellows 95, 97, 99 and 101 by conduits 103, 105, 107 and 109 respectively. Also, within casing 93, are electrical resistances 111 and 113 in series, 115 and 117 in series, and 119 and 121 in series. Conductor 123 couples the common terminal of resistances 115 and 117 with the common terminal of resistances 119 and 121.

The effective values of resistances 111 and 113 are varied by the movement of contactors 123 and 125 respectively, the contactor 123 being reciprocated by bellows 95 and the contactor 125 being reciprocated by bellows 97 in such a manner that these effective values are directly proportional to the pressures $Pt_2$ and $Pt_1$, respectively. In like manner, the effective values of resistances 115 and 119 are varied by the movement of contactor 127, the said contactor 127 being reciprocated by bellows 99. Similarly, the effective values of resistances 117 and 121 are varied by the movement of contactor 129, the said contactor being reciprocated by bellows 101. The contactors 123, 125, 127 and 129 control the effective values of resistances 111, 113, 115 or 119 and 117 or 121 by means of the attached conductors 124, 126, 128 and 130 respectively. Resistances 119 and 121 are so wound that their values vary proportionally to $Pt^n$ and $Ps^n$ respectively. In similar manner, resistances 115 and 117 are so wound that their values vary proportionally to $Pt^m$ and $Ps^m$ respectively, where $m$ is a constant exponent selected to avoid combustor blowouts during deceleration, as hereinafter described.

A source of potential such as battery 131 is connected to contacts 133 and 135, which are carried on valve stem 79 by conductors 137 and 139 respectively. Battery 131 also supplies current to the inverter and amplifier 141 through conductors 143 and 145. When contacts 133 and 135 are moved upward against contacts 147 and 149 respectively, resistances 119 and 121 are connected with resistances 111 and 113 in the conventional Wheatstone bridge arrangement by means of conductors 151 and 153. In like manner, when contacts 133 and 135 are moved downward they complete circuits through contacts 155 and 157 respectively and connect resistances 115 and 117 in the Wheatstone bridge arrangement with resistances 111 and 113 through conductors 159 and 161. The output voltage of either of the Wheatstone bridge arrangements described above is conveyed by conductors 163 and 165 to the inverter and amplifier 141, where it is inverted to an alternating current voltage and amplified to control the rotation of motor 73 through conductors 167 and 169.

Fig. 3 graphs the relation of fuel flow to the speed of engine rotation. Line X represents the maximum fuel flow that is available through the acceleration valve 17 alone. Line Y represents the maximum fuel flow that is available through the governor valve 21 alone. Line Z represents the maximum combined fuel flow that is available through the acceleration and governor valves. Broken line A represents the minimum fuel flow that is permissible without combustion blowout, and corresponds to the fuel flow that occurs during the operating condition that satisfies the relation $$\frac{Pt_2}{Pt_1}=\left(\frac{Pt}{Ps}\right)^m=\frac{Pt^m}{Ps^m} \quad (6)$$

Broken line B represents the fuel flow requirement of the engine during steady-state operation. Broken line C represents the maximum fuel flow that is permissible without compressor stall, and corresponds to the fuel flow that occurs during the operating condition that satisfies the relation expressed in Formula 2 hereinabove. Accordingly, operation of the subject device within the limits desired, so that compressor surge during transient acceleration or combustion blowout during transient deceleration is avoided, is effected as follows:

During steady-state operation, the governor valve 21 regulates the flow of fuel to the engine between the limits of lines X and Y (Fig. 3) so as to maintain the selected operating engine speed on line B. During this type of operation, contacts 133 and 135 do not connect with either the electrical circuit including resistances 115 and 117 nor with the electrical circuit including resistances 119 and 121. Since this action results in the Wheatstone bridge circuit being open during steady-state operation, the voltage output of such bridge circuit is zero. Accordingly, needle 65 in the acceleration valve 17 remains fixed in position, since there is no signal to amplifier 141 and motor 73.

During an acceleration, governor valve 21 is wide open, and acceleration valve 17 regulates the flow of fuel to the engine between the limits of lines Y and Z (Fig. 3), in such a manner as to maintain operation along line C:

When the pilot advances the control lever 85, the speeder spring 83 is compressed, forcing valve 77 open and connecting contacts 133 and 135 with contacts 147 and 149 respectively. The making of such contacts creates a Wheatstone bridge in the circuit, such bridge being composed of resistances 111, 113, 119 and 121. If such resistances are related by the equation $$\frac{R_{111}}{R_{113}} = \frac{R_{119}}{R_{121}} \quad (7)$$

the output of the bridge is zero and motor 73 does not rotate. If, however, $$\frac{R_{111}}{R_{113}}$$

is greater than $$\frac{R_{119}}{R_{121}}$$

there will be a positive voltage output from the bridge. Such output, when amplified by amplifier 141, rotates the motor 73 clockwise and through the linkage provided reduces the area between needle 65 and the orifice in plate 63. This action reduces the fuel flow to the engine, which in turn reduces the value of the compressor discharge pressure $Pt_2$. This results in the force exerted within bellows 95 by $Pt_2$ being reduced so that contactor 123 moves to the left and reduces the effective value of resistance 111 until the equilibrium condition described by Equation 7 is reached. If $$\frac{R_{111}}{R_{113}}$$

is less than $$\frac{R_{119}}{R_{121}}$$

there will be a negative voltage output from the bridge and the reverse of the above-described action takes place so as to maintain the relation expressed in Equation 7. As the R. P. M. of the engine continues to increase, the force exerted by the flyweights increases. As the new desired R. P. M. is approached, the force of the flyweights 81 move valve stem 77 downward, opening the bridge circuit and returning to normal steady-state governing operation.

Since the subject device maintains the relation of Equation 7 during acceleration, and since the elements within casing 93 maintain the relations $$R_{111} = CPt_2$$
$$R_{113} = CPt_1$$
$$R_{119} = CPt^n$$
$$R_{121} = CPs^n$$

where C is a proportionally constant, substitution of these latter values in Equation 7 gives $$\frac{Pt_2}{Pt_1} = \left(\frac{Pt}{Ps}\right)^n$$

which is Equation 2, the incipient stall characteristic of the compressor, and corresponds to the operating line C in Fig. 3. Accordingly, the control of fuel flow to the engine during acceleration in such a manner as to prevent compressor surge can be accomplished.

The compressor operating condition presumed to exist at minimum allowable fuel flow during deceleration can be approximated by Equation 6 hereinabove, where $m$ is a constant exponent that defines a lower limit of the compressor pressure ratio $$\frac{Pt_2}{Pt_1}$$

for steady-state operation.

During a deceleration, governor valve 21 closes completely. Fuel flow to the engine is regulated by the acceleration valve 17 between the limits of zero and that shown by line X (Fig. 3).

Operation is maintained along line A within these limits. This is accomplished by the subject device in similar manner to the control means during acceleration, the difference being that contacts 133 and 135 connect with contacts 155 and 157 respectively instead of with contacts 147 and 149. Thus, during decelerations, the Wheatstone bridge in operation comprises resistances 111, 113, 115 and 117, and the condition defined by Equation 6 is maintained.

Obviously many modifications and variations of the present invention are possible in the light of the above teachings. It is therefore to be understood that within the scope of the appended claims the invention may be practiced otherwise than as specifically described.

I claim:

1. Apparatus for controlling fuel flow to a gas turbine engine during transient acceleration and deceleration conditions, said apparatus comprising conduit means adapted to carry fuel to such engine, an acceleration valve and a governor valve in parallel in said conduit means, motor means to increase or decrease the orifice of said acceleration valve, a first means to drive said motor to increase said orifice actuated by movement of said governor valve to one limit of the orifice of said governor valve, and a second means to drive said motor to decrease said orifice actuated by movement of said governor valve to the opposite limit of the orifice of said governor valve.

2. Apparatus for controlling fuel flow to a gas turbine engine during transient acceleration and deceleration conditions, said apparatus comprising conduit means adapted to carry fuel to such engine, an acceleration valve and a governor valve in parallel in said conduit means, motor means to increase or decrease the orifice of said acceleration valve, a first means to drive said motor to increase said orifice actuated by movement of said governor valve to one limit thereof, and a second means to drive said motor to decrease said orifice actuated by movement of said governor valve to the opposite limit thereof.

3. Apparatus for controlling fuel flow to a gas turbine engine during transient acceleration and deceleration conditions, said apparatus comprising conduit means adapted to carry fuel to such engine, an acceleration valve and a governor valve in parallel in said conduit means, motor means to increase or decrease the orifice of said acceleration valve, a first means to drive said motor to increase said orifice actuated by movement of said governor valve a predetermined distance towards increase of the orifice of said governor valve, a second means to drive said motor to decrease said orifice actuated by movement of said governor valve a predetermined distance towards decrease of the orifice of said governor valve, said first and second means each including means to limit the change in the orifice of said acceleration valve to an amount bearing a predetermined relation to a change in a discrete selected pressure ratio in such engine.

4. Apparatus for controlling fuel flow to a gas turbine engine during transient acceleration and deceleration conditions, said apparatus comprising conduit means adapted to carry fuel to such engine, an acceleration valve and a governor valve in parallel in said conduit means, motor means to increase or decrease the orifice of said acceleration valve, a first means to drive said motor to increase said orifice actuated by movement of said governor valve a predetermined distance towards increase of the orifice of said governor valve, a second means to drive said motor to decrease said orifice actuated by movement of said governor valve a predetermined distance towards decrease of the orifice of said governor valve, said first and second means each including a Wheatstone bridge circuit having resistances variable in response to variations in selected pressure differentials in such engine to limit the change in the orifice of said acceleration valve to an amount bearing a predetermined relation to one of the changes in such pressure ratios.

5. Apparatus for controlling fuel flow to a gas turbine engine during transient acceleration and deceleration conditions, said apparatus comprising conduit means adapted to carry fuel to such engine, a plurality of means to sense selected pressures in such engine, an acceleration valve and a governor valve in parallel in said conduit means, motor means to increase or decrease the orifice of said acceleration valve, a first means to drive said motor to increase said orifice actuated by movement of said governor valve a predetermined distance towards increase of the orifice of said governor valve, a second means to drive said motor to decrease said orifice actuated by movement of said governor valve a predetermined distance towards decrease of the orifice of said governor valve, said first and second means each including an evacuated casing carrying a plurality of bellows each coupled to one of said pressure sensing means and responsive thereto, each bellows carrying a contact arm, a first Wheatstone bridge circuit having resistances each varied by one of said contact arms, a second Wheatstone bridge circuit having resistances each varied by one of said contact arms, each of said resistances being so wound that the change in the orifice of said acceleration valve is limited to an amount bearing a constant predetermined relation to variations in selected pressure differentials in such engine.

6. Apparatus for controlling fuel flow to a gas turbine engine during transient acceleration and deceleration conditions, said apparatus comprising conduit means adapted to carry fuel to such engine, an acceleration valve in said conduit means, a governor valve in said conduit means in parallel with said acceleration valve, an evacuated casing carrying a plurality of bellows, a gas turbine compressor, a first pressure tube in the output end of said compressor connected to the interior of the first of said bellows, a second pressure tube in the input end of said compressor connected to the interior of the second of said bellows, a third pressure tube in said compressor having its mouth facing the air flow therein and connected to the interior of the third of said bellows, a static pressure tube in said compressor at said mouth connected to the interior of the fourth of said bellows, a first Wheatstone bridge having a first, second, third and fourth resistance, a second Wheatstone bridge having said first and second and a fifth and sixth resistance, means operated by motion of said first and second bellows respectively to vary the effective resistance, respectively, of said first and second resistance directly with variations in the input and output pressures of said compressor, means operated by motion of said third and fourth bellows respectively to vary said third and fifth, and said fourth and sixth resistances respectively directly with changes in the pressure of said mouth and said static pressure respectively, the variation of said third and fourth resistances being at the $n$th power of said pressure changes and of said fifth and sixth resistances being as the $m$th power of said pressure changes, $m$ being less than $n$, means for operating said acceleration valve in accordance with the output of said first bridge to control the fuel flow during engine decelerations to avoid combustion blowout, means for operating said acceleration valve in accordance with the output of said second bridge whereby the fuel flow through said acceleration valve is controlled during engine accelerations to avoid compressor surge, switch means for opening alternatively the circuits of either one or both of said bridges, and flyweight means operated by said compressor for operating said switch means.

References Cited in the file of this patent

UNITED STATES PATENTS

| Number | Name | Date |
|---|---|---|
| 1,921,710 | Stöhr | Aug. 8, 1933 |
| 2,127,172 | Hermitte | Aug. 16, 1938 |
| 2,441,948 | Atkinson | May 25, 1948 |
| 2,487,774 | Schipper | Nov. 8, 1949 |
| 2,489,586 | Ray | Nov. 29, 1949 |
| 2,566,373 | Redding | Sept. 4, 1951 |

FOREIGN PATENTS

| Number | Country | Date |
|---|---|---|
| 661,605 | France | Mar. 5, 1929 |
| 941,556 | France | July 19, 1948 |